Nov. 18, 1958  J. W. KERR  2,860,914
RETRACTIBLE HARDTOP FOR MOTOR VEHICLES
Filed Jan. 26, 1956  8 Sheets-Sheet 1

INVENTOR.
James W. Kerr
BY
Elmer Jamison Gray
ATTORNEY

Nov. 18, 1958  J. W. KERR  2,860,914
RETRACTIBLE HARDTOP FOR MOTOR VEHICLES
Filed Jan. 26, 1956  8 Sheets-Sheet 3

INVENTOR.
James W. Kerr
BY
Elmer Jamison Gray
ATTORNEY

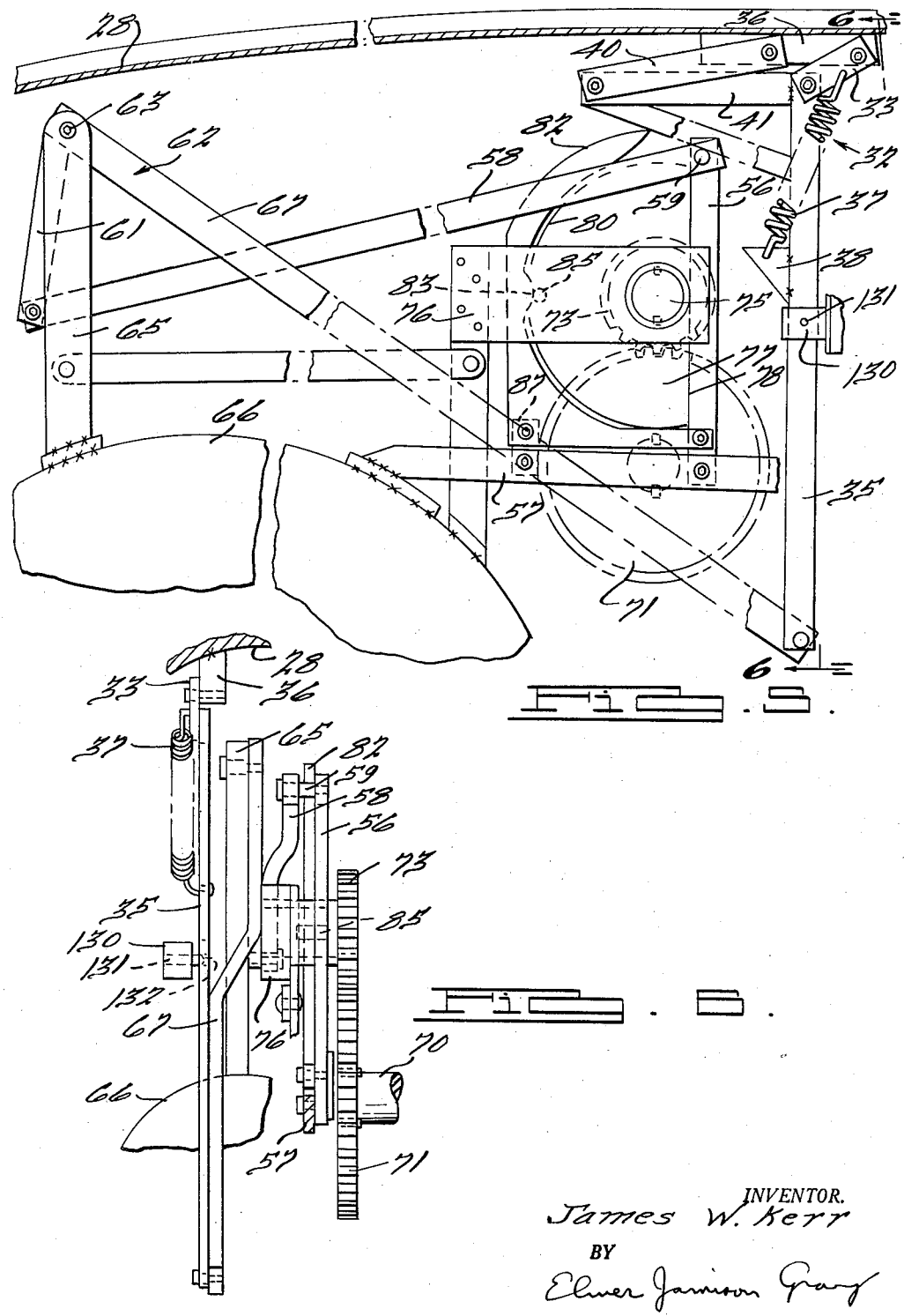

Nov. 18, 1958  J. W. KERR  2,860,914
RETRACTIBLE HARDTOP FOR MOTOR VEHICLES
Filed Jan. 26, 1956  8 Sheets-Sheet 5
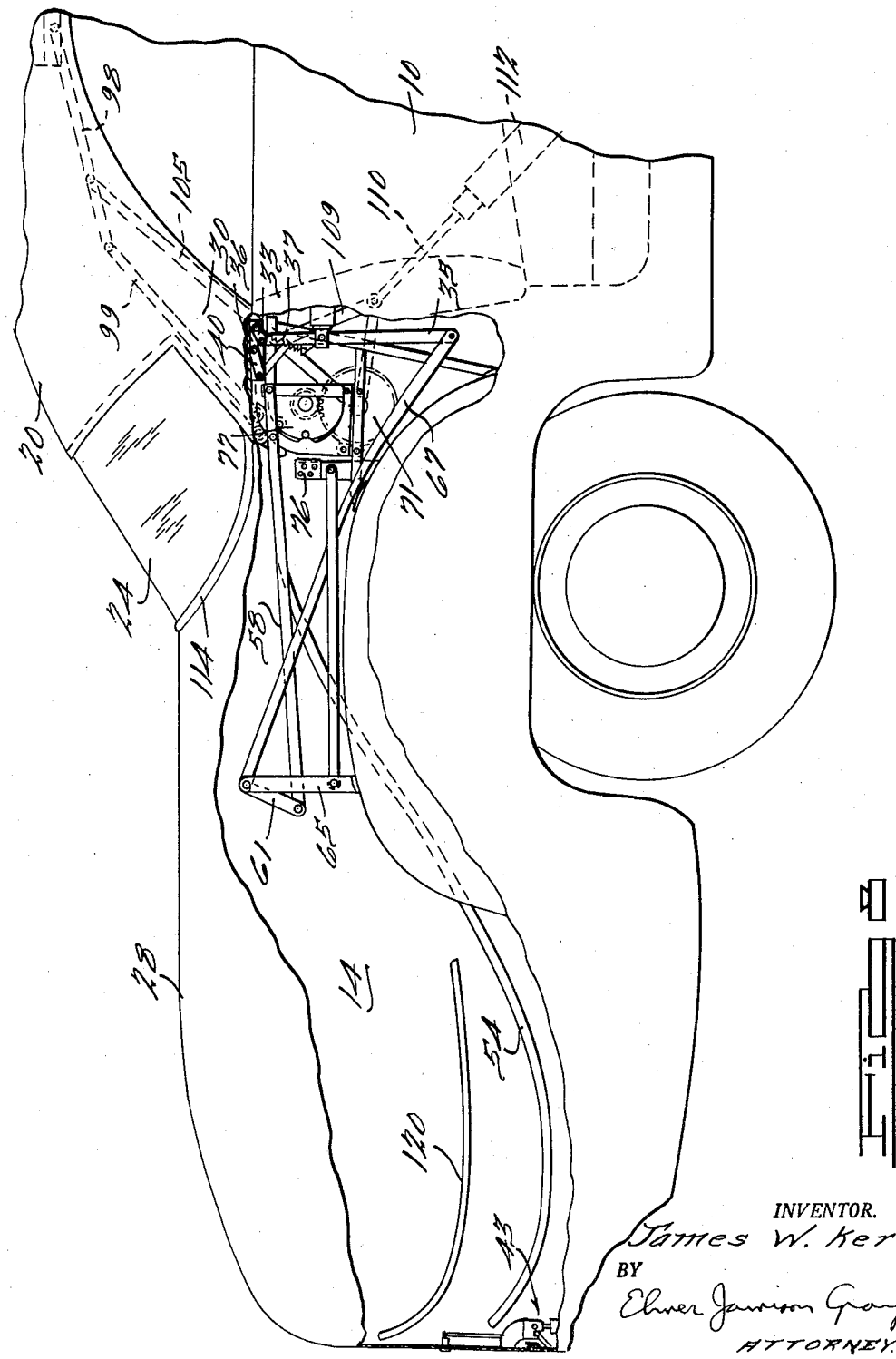
INVENTOR.
James W. Kerr
BY
Elmer Jamison Gray
ATTORNEY.

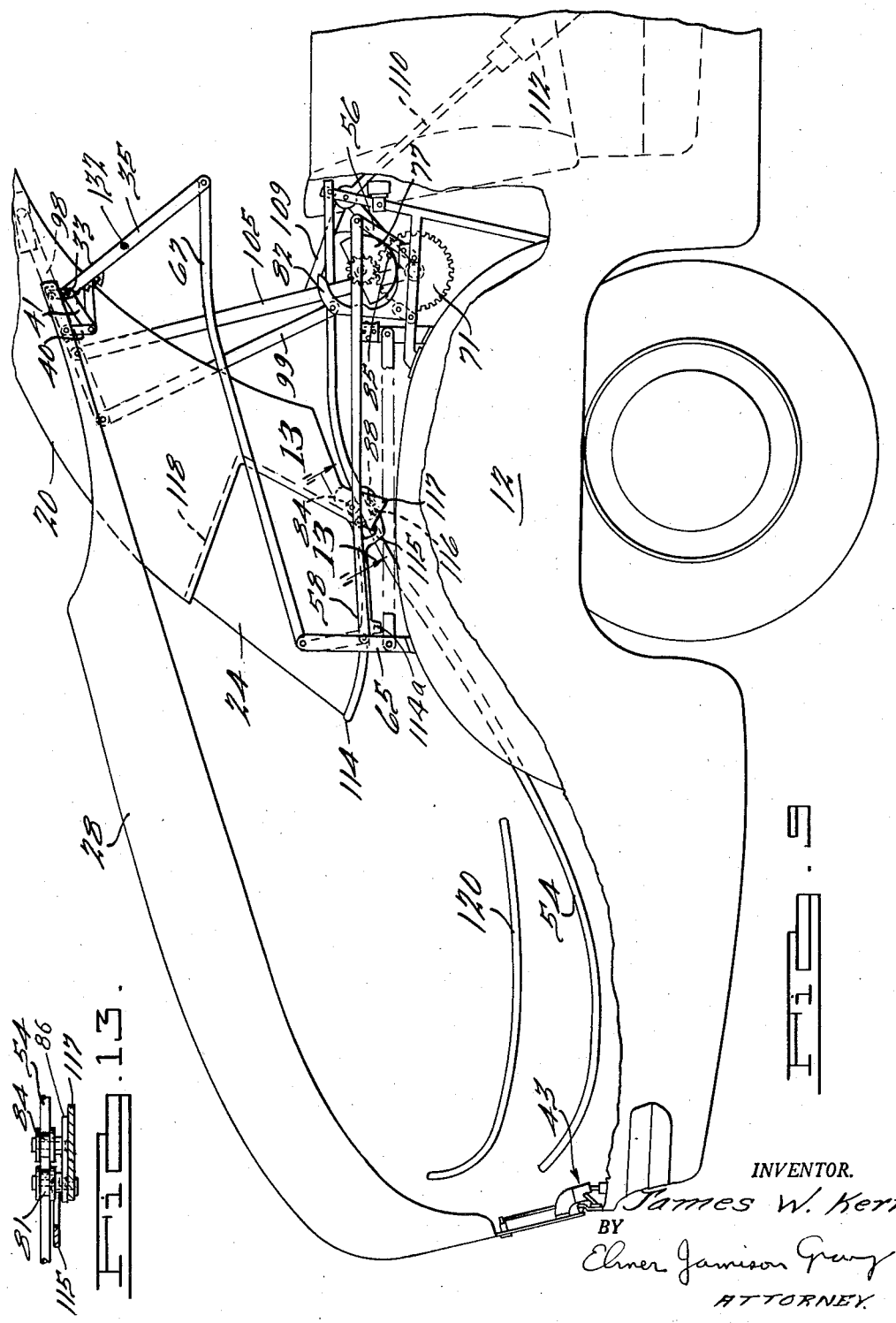

Nov. 18, 1958   J. W. KERR   2,860,914
RETRACTIBLE HARDTOP FOR MOTOR VEHICLES
Filed Jan. 26, 1956   8 Sheets-Sheet 7
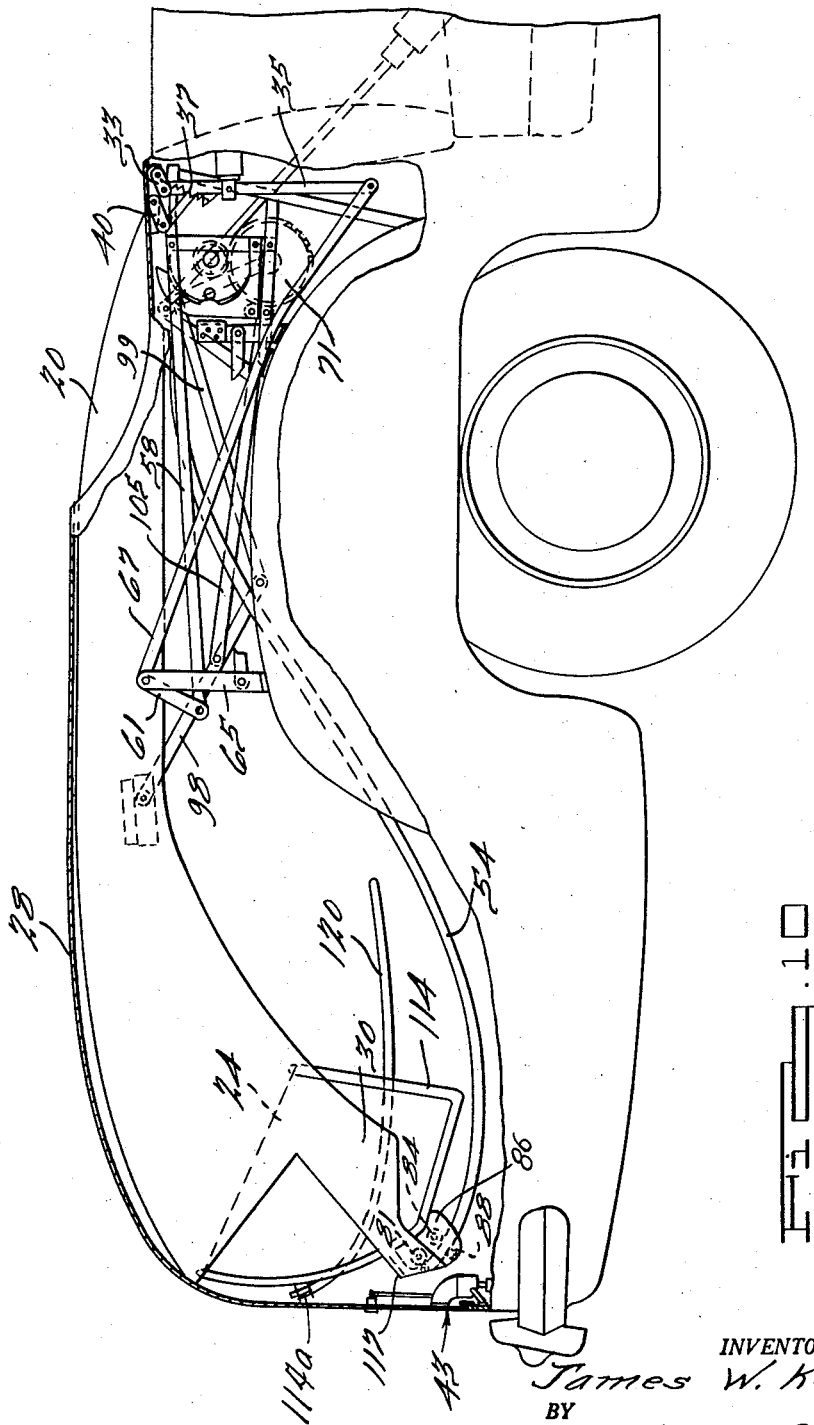
INVENTOR.
James W. Kerr
BY
Elmer Jamison Gray
ATTORNEY.

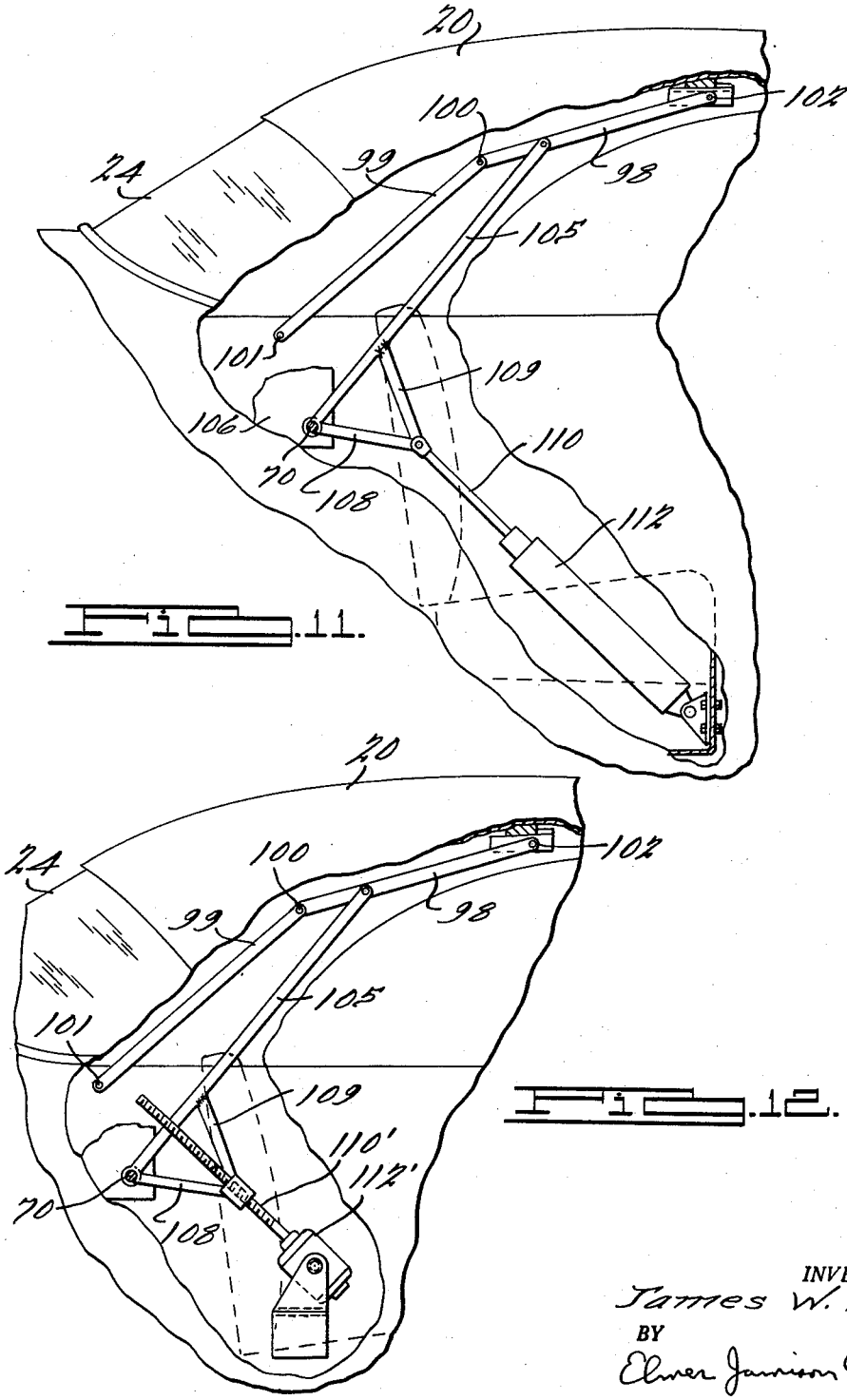

United States Patent Office 2,860,914
Patented Nov. 18, 1958

2,860,914

RETRACTIBLE HARDTOP FOR MOTOR VEHICLES

James W. Kerr, Detroit, Mich.

Application January 26, 1956, Serial No. 561,619

7 Claims. (Cl. 296—117)

This invention relates to improvements in convertible bodies for motor vehicles and is particularly directed to vehicle top structure of substantially one-piece construction automatically movable from one position to another either over the passenger compartment or within the trunk or storage compartment to expose the passenger compartment, and thereby selectively provide a closed or open type vehicle.

A primary object of the invention is to provide power operated mechanism synchronized to raise the storage compartment cover and transfer the top structure from raised position over the passenger compartment to lowered position within the storage compartment and then close the cover to substantially conceal the top. Conversely, the mechanism is operable to raise the cover and raise the top and again close the storage compartment cover.

Another object of the invention resides in the provision of mechanism to open and close the trunk lid from the front to receive the top, as well as means to open and close the trunk lid from the rear when the top is up or fully retracted to permit access to the cargo space.

A further object of the invention is to provide means to reposition the rear window with respect to the top as the latter is lowered to reduce the possibility of breakage of the glass to a minimum and at the same time provide maximum space for cargo within the trunk when the top is retracted.

A still further object of the invention is to increase the customary passenger space in so-called convertibles by utilizing the full width of the body for seating capacity by eliminating the usual top storage compartment or pocket normally disposed at the sides as well as in the rear of the back seat.

Further objects and advantages of the invention will become apparent from a study of the following description when taken in connection with the accompanying drawings intended to be illustrative rather than restrictive and in which:

Figure 5 is a side view of the deck lid operating mechanism;

Figure 6 is a detail view of the deck lid operating mechanism taken in the direction of the arrows 6—6 of Figure 5;

Figure 7 is a top view of the top operating leverage and the linkage shown in Figures 5 and 6;

Figure 8 is a fragmentary side view illustrating details of the invention with the parts in top raised position;

Figure 9 is a view similar to Figure 8 but with the parts in top lowering position;

Figure 10 is a view similar to Figure 8 but with the parts in top lowered position;

Figure 11 is a fragmentary side view of the top operating leverage and power operating means;

Figure 12 is a view similar to Figure 11 but illustrating another form of power operating means; and Figure 13 is a detail view taken on a line 13—13 of Figure 9, Fig. 14 is an enlarged fragmentary view illustrating the connection between the rear window and the retractible top or roof.

Figure 1:
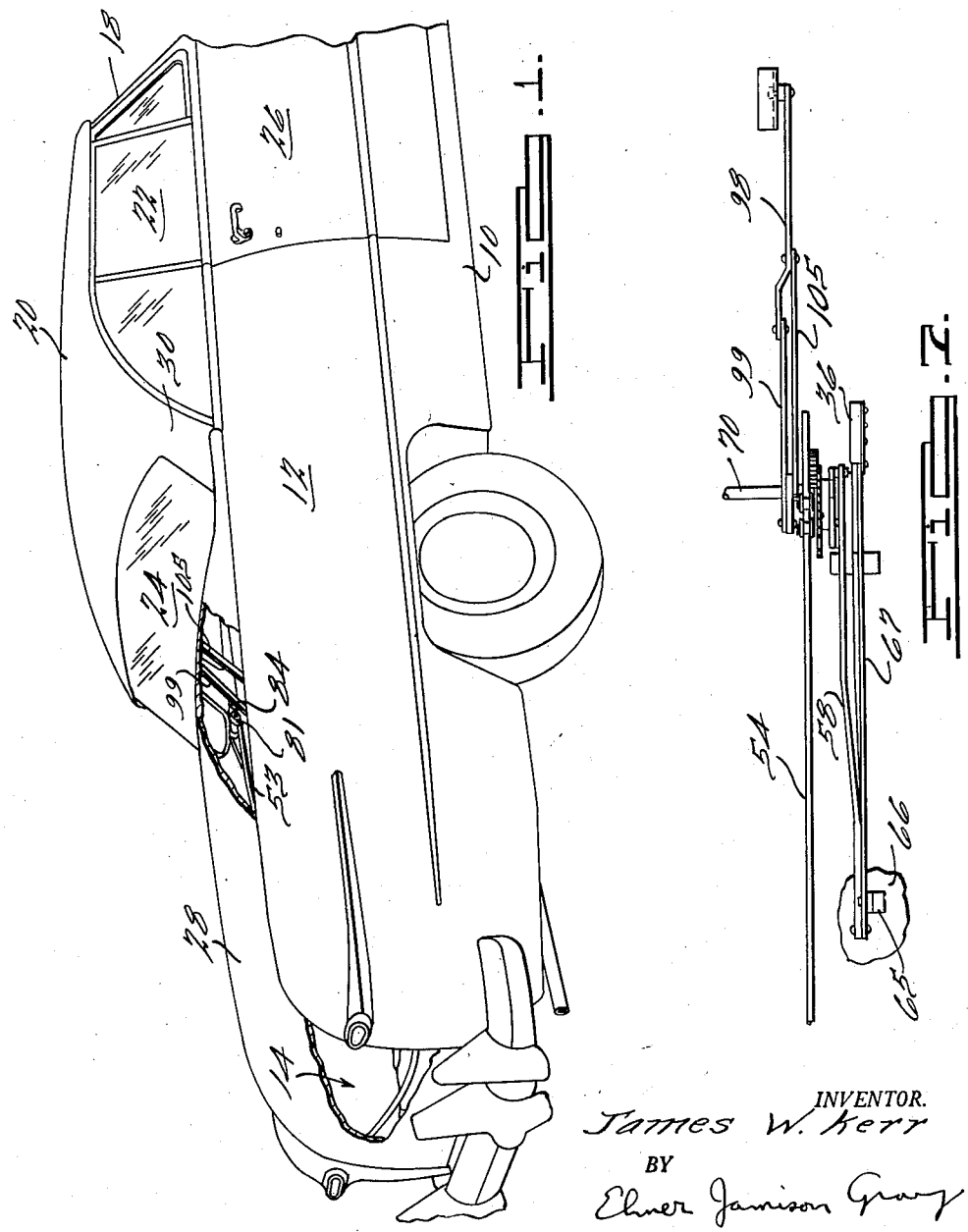
Figure 1 is a fragmentary rear quarter view of an automotive vehicle incorporating a form of the invention with the top raised.
Figure 2:
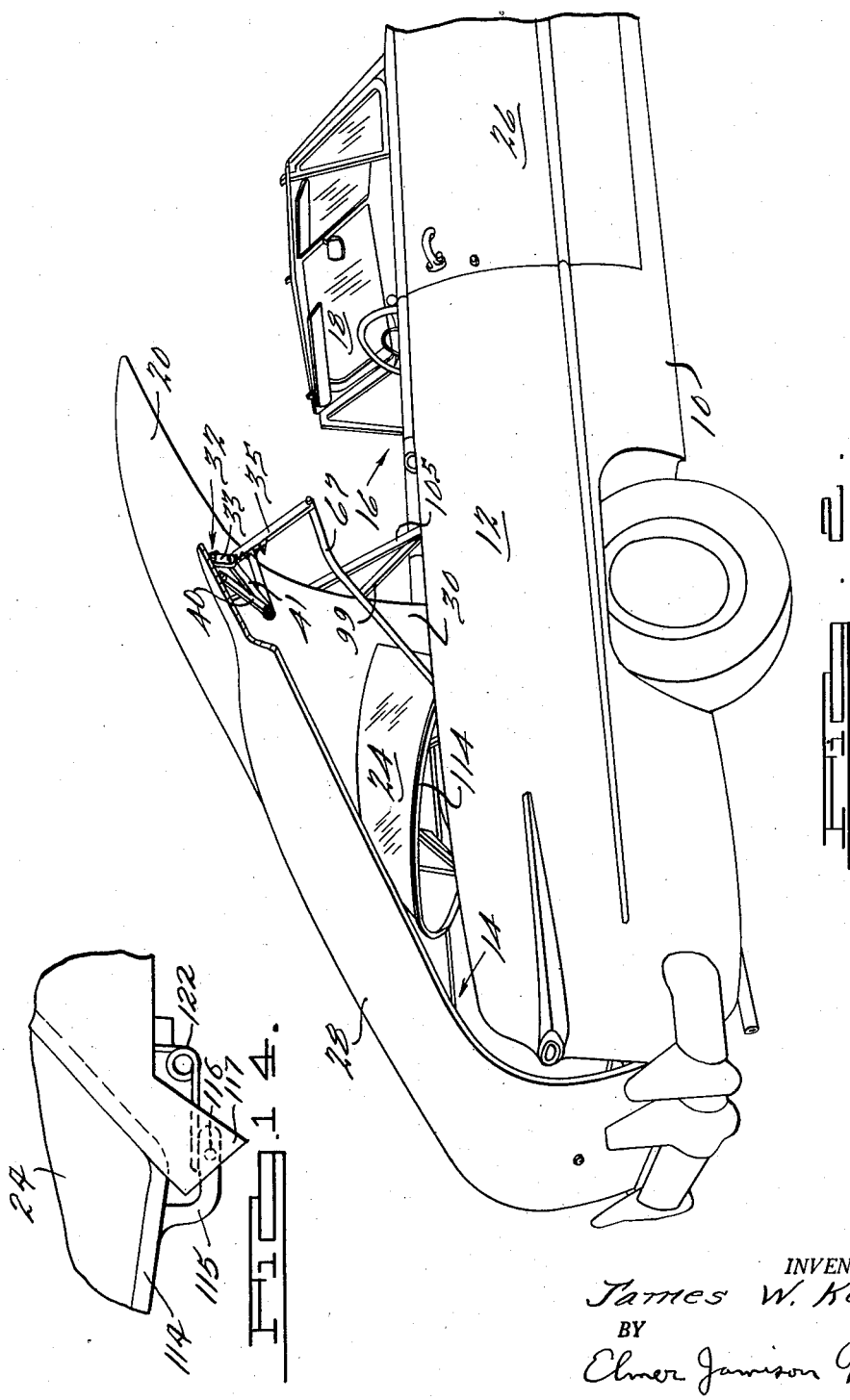
Figure 2 is a view similar to Figure 1 but illustrating the rear deck lid raised and the top in partially lowered position.
Figure 3:
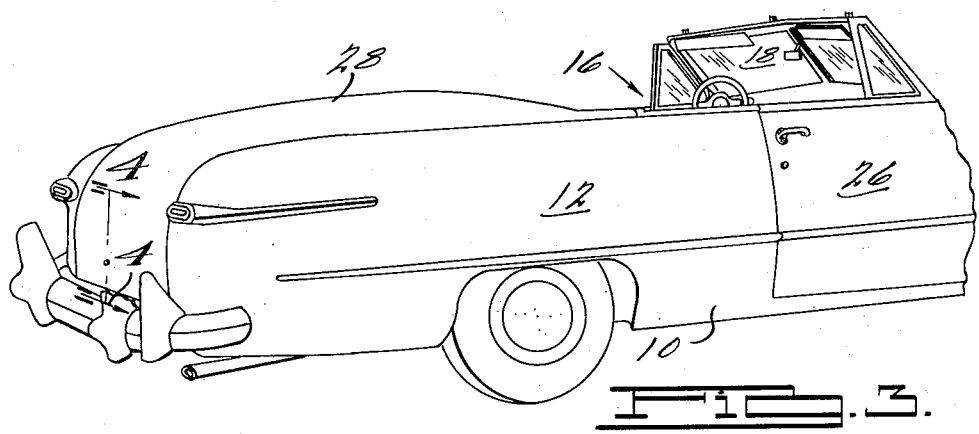
Figure 3 is a view similar to Figure 1 but illustrating the vehicle with the top completely lowered.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A form of the invention which may be preferred has been illustrated in the drawings which show an automobile of the so-called convertible type which includes a body 10 having a rear quarter section 12, luggage compartment or trunk 14 and a passenger compartment 16. Forwardly of the passenger compartment is the usual windshield 18, the upper edge of which serves as one support for a retractible rigid roof or top 20 which extends rearwardly to the luggage compartment 14. The usual movable side windows 22 are adapted to close the space between the body and the top, and a rear window 24 is normally positioned in fixed relation between the movable top 20 and the luggage compartment 14 when the top is raised. Entrance to the passenger compartment is through doors 26, while access to the luggage compartment 14 is gained by raising a normally closed deck lid or closure 28 from the lower edge in the usual manner.

The rigid roof or top 20 is preferably of one-piece construction and may be fabricated of metal or plastic to overlie the passenger compartment, side panels 30 extending downwardly from the main top portion to the body 10 adjacent the forward portion of the luggage compartment 14. The lower ends of the side panels 30 serve to further support the top as hereinafter described.

Deck lid 28 is hingedly secured to the body by means adjacent its front side edges. With particular reference to Fig. 5, one such means has been shown as comprising a spring balanced hinge structure 32 of somewhat conventional form in which a short link 33 is pivotally connected at one end to a generally vertical member 35 forming a part of deck lid operating linkage to be described. The other end of link 33 is connected to a bracket 36 welded or otherwise secured to the inner surface of the cover 28. Tension spring 37 is connected between link 33 and an ear 38 fixed to the member 35 to apply downward pressure on the link 33. A second hinge link 40 is pivotally connected between the bracket 36 and a generally horizontal arm 41 projecting rearwardly from the member 35. The hinge structure 32 is duplicated at the other side of the deck lid 28.

Lock mechanism indicated generally at 43 is provided to retain the deck lid 28 in closed position, release of such locking means permitting the lid 28 to be raised from its lower edge and swung upwardly about the hinges 32. Thus, hinge means are provided by which the deck lid may be opened from the rear in the ordinary manner. The hinges 32 are secured to movable elements 35 which permit the deck lid to be opened from the front as well as the rear, in which case the lock structure 43 also serves as the pivot about which the lid 28 may be swung to open position.

Figure 4:
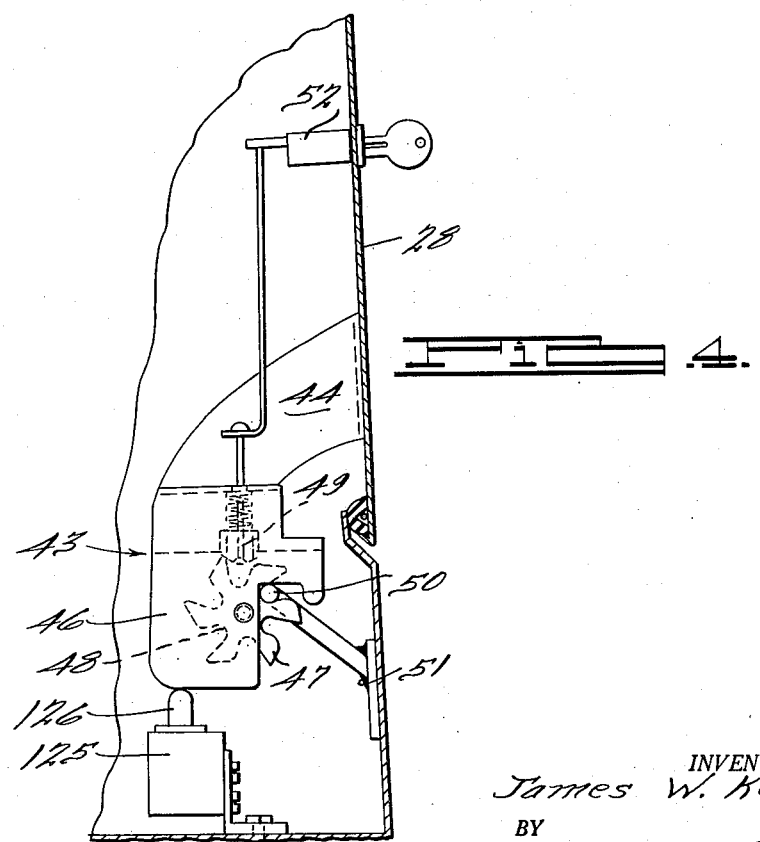
Figure 4 is a sectional detail view taken substantially on a line 4—4 of Figure 3.

The combined rear deck lock and hinge structure 43 as particularly shown in Figure 4 consists of a supporting bracket 44 suitably secured to the inner surface of the deck lid 28. Fixed to bracket 44 is a housing 46 the side walls of which support a rotary tumbler 47 having a series of detents 48 for the reception of a spring pressed locking plunger 49 and a keeper 50. The keeper 50 is of generally U-shape having its legs welded or otherwise secured to the body as at 51 so that the bight of the U projects inwardly toward the lock structure for reception in the detents 48. The plunger 49 is withdrawn from its detent by rotation of a key receiving tumbler 52 in the usual manner which permits the lid 28 to be raised from locked position by permitting the tumbler to rotate and be disengaged from the keeper 50. A releasable or retractible pivot is thus provided for the rear of the deck lid 28.

To guide the top in its movement from one position to another, guideways or tracks 53 and 54 are provided in the fixed part of the body and are so shaped as to guide the top in its movements so that it will move from its closed position rearwardly and downwardly to a position within the rear compartment 14 where it is substantially concealed. These guides 53 and 54 are provided on each side of the body. The guides may be of any suitable cross-section and extend from a point near the rear of the passenger compartment 16, following rearwardly close to the sides of the rear quarter section and terminate adjacent the floor of rear compartment 14. These guides 53 and 54 extend from a point near the lower rear part of the raised top 20 rearwardly and downwardly within the rear compartment 14, and are then curved and extend rearwardly and slightly upwardly.

The shape of the guideways 53 and 54, as above described, are those which will guide the top of the design shown in the correct manner so that it will pass into the rear compartment as desired. It will be understood that the shapes of the guides 53 and 54 will vary with different shapes and proportions of tops and bodies.

Mechanism is provided to open the deck lid 28 from the front just prior to the initial movement of the top from raised position to lowered position. This is accomplished by arranging the operating means for the deck lid and the top moving leverage so that a common actuating member motivates them in timed relation. By way of example, a single actuating shaft may be provided to which is secured an element of the deck lid operating means and the top moving leverage so that upon rotation of the shaft the mechanisms are operated in proper sequence.

The keeper mechanism 50 also serves as the pivot about which the deck lid 28 may be swung by the operating leverage, now to be described, by which the compartment 14 is opened, by raising deck lid 28 at its forward edge, to receive the top 20. With particular reference to Figure 5, the mechanism to raise the rear deck is shown at rest, it being noted that the generally vertical arm 56 is pivoted to a bracket 57 at its lower end and has a relatively long link 58 pivoted to its upper end at 59. The link 58 extends generally rearwardly at a downwardly inclined angle and is pivotally connected at its rearward end to a short leg 61 of a rocker arm 62 pivoted at 63 to an upstanding support 65 in turn secured to a portion of the body web as wheel housing 66. The long leg 67 of rocker arm 62 extends forwardly and downwardly to a point in advance of vertical arm 56 and is also pivotally connected to the vertically disposed actuating arm or bar 35 to which the hinge structure 32 is secured.

Rigid with a shaft 70 is a gear 71 which meshes with a second comparatively small gear 73 supported for rotation with gear 71 on a stub or cam shaft 75 supported by bracket 76. A cam 77 on shaft 75 serves to actuate the operating arm 56 of closure actuating mechanism. By this arrangement it will be clear that forward swinging movement of operating arm 56 will be translated to vertical movement of support 35 to raise the deck lid from its forward edge.

To swing the arm forwardly the cam 77 is provided with a flat cam surface 78 normally in engagement with the arm 56 in a position of rest. Rotation of cam clockwise moves arm 56 to the right rapidly to initiate the movement of the linkage. Continued movement of cam 77 causes the arcuate portion 80 of cam to engage the arm 56 to continue the swinging movement of arm 56 to elevate the deck lid sufficiently to receive the top which is being lowered into the compartment. One complete revolution of cam 77 raises and closes the deck lid.

Means are provided to support the rear of the top in raised position as well as during movement while being retracted and in lowered position. Such means consist of a pair of rollers 81 and 84 to ride on the guideways 53 and 54 and as shown are mounted on a bracket 86 carried by the lower end of the rear top panel sections 30. To insure engagement of the rollers 81 and 84 with the guides, retainer rolls 88 are also provided to engage the lower surface of the guides. Such an arrangement enables the top operating mechanism to manipulate the top with ease.

To assist in swinging arm 56 back to again close the lid after the top is completely lowered, cam follower 82 is provided with a projection 83 engageable by the cam pin 85 as it continues its clockwise rotation. Cam follower 82 is pivoted to arm 56 and to a short link 87 also pivoted to bracket 57 so as to follow arm to the right as the cam 77 is rotated one half turn. As the pin 85 approaches the projection 83 it urges the follower to the left to start the reverse swinging movement of arm 56. As the arm 56 starts its rearward movement, the weight of the deck lid moves the vertical link 35 downwardly and the operating linkage moves in the opposite direction.

As the rear compartment cover is raised, the top section is moved rearwardly and downwardly on guideways 53 and 54 provided adjacent each side of the rear compartment in such manner as to initially direct the lower rear corners of the top into the compartment. Due to the provision of a top of substantially one-piece construction, the linkage for tilting the top and moving it rearwardly consists of comparatively few parts. At each side of the body and top is a pair of supporting arms or link members 98 and 99 pivotally connected together at 100 having their opposite ends pivotally connected to the body at 101 and to the top at 102. An actuating lever or link member 105 is provided for each pair of supporting arms, the lever 105 being pivoted to the uppermost arm 98 and to a bracket 106 rigid with the vehicle body. Means are provided to swing the actuating lever 105 about its pivot which may be a stub shaft suitably journalled in bracket 106 or a full shaft extending between the brackets on opposite sides of the body. Such means may be in the form of links 108 and 109 rigid with arm 105 to form a triangle the apex of which is pivotally connected to an actuator shaft 110 which may be the piston rod of an hydraulic cylinder 112 as shown in Fig. 11. Movement of piston rod 110 outwardly of the cylinder 112 will swing arm 105 rearwardly and due to the position of its connection to arm 98 will in turn swing arm 99 about its pivot 101 to move pivot 100 about an arc which moves arm 98 and thus the top rearwardly also about an arc having the guide rollers as a center.

The rear window 24 is preferably mounted in a suitable frame 114 having an angularly disposed arm 115 depending from each lower side edge. Arms 115 are pivotally connected at their extremities at 116 to projections 117 of the top side panels 30. The upper top edge 118 of the window is arranged to have sealing engagement in any suitable manner with the interior of the top adjacent the window opening. The window is otherwise not connected to the top. As the top 20 is lowered into the compartment 14 means is provided for swinging the window 24 upwardly and forwardly about pivots 116 so that the window is displaced from its normal position when the top is raised into a position underlying the top. This is accomplished by means of cam members 114a projecting from the window frame and slidingly engageable with and beneath elongated cam guides 120 positioned in the rear of the compartment 14. Spring means 122 acting on each arm 115 is provided for the purpose of assisting in returning the window 24 to normal position as the top is raised.

It will be clear that the retractible pivot 50 must be in engagement with the lock mechanism 43 while the deck lid is opened from the front to receive the top. Accordingly, it is desirable to provide means to prevent the operation of the mechanism to open the lid 28 from the front when the lid is not completely closed at the rear. To accomplish this any suitable means may be provided, as for example, a switch mechanism 125 having a plunger 126 engaged by the lock housing 46 to make contact in an electrical circuit associated with the control for actuating the top operating mechanism.

It is likewise desirable to lock the top operating mechanism in its position of rest when the top is up or fully retracted. This may be accomplished by providing a solenoid at 130 to operate a plunger 131 engageable with an aperture 132 in the lever 35 when the latter is in its lowermost position.

The operation of the device will be readily understood. The motor 112 can operate in both directions and a suitable control device is provided to control the direction of motion according to the position of the movable top. Assuming the top is in raised position over the passenger compartment as shown in Fig. 8, the motor is actuated to move the rod or bar 110 outwardly. Such movement first swings lever 105 to the rear, rotating the shaft 70 counterclockwise. Large gear 71 rotates with shaft 70 and causes smaller gear 73 to rotate clockwise at a faster rate than gear 71, which also turns cam 77 also in a clockwise direction to swing the lever 56 to the right. The linkage connected to the lever 56 then lifts the lid 28 upwardly from its forward end as above described. As the lid 28 is being raised, the lever is continuing to be swung rearwardly to move the top 20 first to the rear and then downwardly as will be understood, due to the curvature of the guideways 53 and 54. Upon reaching its lowered position the top comes to rest, but the cam 77 continues to make a complete revolution before coming to rest, and as the projection 83 on the cam follower is engaged by the pin 85 on the cam, the cam follower is moved to the left slightly to initiate the return of lever 56 also to the left. At this time the linkage has passed over center, and the lid starts its downward movement, assisted by the weight of the deck lid 28.

In moving from closed position the forward part of the top moves upwardly and rearwardly because of the upward movement imparted to the forward end of lever 98. This slight upward movement separates the top from the upper edge of the windshield 18. The first movement of the rear part of the top is rearwardly and slightly downwardly causing it to separate from the rear edge of the passenger compartment opening and the rear portion of the top to move downwardly into the compartment 14. In the continued movement of the top, the rear portion is given a slight upward movement just prior to coming to rest due to the shape of the rear ends of the guides 53 and 54. This movement levels the top so that its forward end lies comparatively flat rearwardly of the rear seat in the passenger compartment. This also permits the deck lid to substantially conceal the top in its lowered position.

To return the top to raised position the motor 112 is actuated to move the rod 110 inwardly, which reverses the direction of movement of the lever 105 to swing it forwardly. This causes the gear 71 to rotate clockwise and gear 73 to rotate counterclockwise, which also turns cam 77 in the reverse direction which however also causes the actuation of the lever 56 to again raise the deck lid by its operating linkage as previously described. The continued movement of rod 110 inwardly swings the lever further to the right to move the top forwardly and upwardly until it is again positioned over the passenger compartment. Pin 85 again engages the projection 83 and lever 56 is given a slight movement to the left to again initiate the downward movement of the deck lid 28.

While the above described mechanism for actuating the top by means of an hydraulic motor is considered desirable it is conceived that other specific means for power actuation may be substituted and the power may for example be obtained from an electric motor 112'. It will be seen that the top may be readily moved from one position to another by substituting a reversible electric motor 112' for the hydraulic cylinder 112 in which case the rod 110 is replaced by a threaded screw 110' to actuate the lever 105, as particularly shown in Fig. 12.

It will be seen that this invention provides a retractible top that is rigid, durable, easily manipulated from one position to another, weather-tight when closed and substantially concealed when opened or lowered. Its operation merely requires the actuation of a button which initiates the power operating mechanism. The top structure may be entirely fabricated as a unit and then assembled on the vehicle body.

I claim:

1. In an automotive vehicle having a body provided with a passenger compartment, a retractible rigid top for said passenger compartment, said top having an upper portion and rear side portions at opposite sides thereof defining a rear central opening, a deck lid pivotally mounted at its rearward end upon said vehicle body, means to support and guide said top during its travel in a predetermined rearward and downward path, a window pivotally mounted in said rear central opening, means on said body for engaging and swinging said window from a position closing the rear central opening in said top to a position underlying the rear of said top, and means for raising the forward end of said deck lid in timed relation with respect to the rearward and downward movement of said top to store said top beneath said deck lid, said means being subsequently operable to raise said deck lid and restore said top to its position over said passenger compartment.

2. In an automotive vehicle having a body provided with a passenger compartment, a retractible rigid top for said passenger compartment, said top having an upper portion and rear side portions at opposite sides thereof defining a rear central opening, a deck lid pivotally mounted at its rearward end upon said vehicle body, means associated with the rear side portions of said top to support and guide said top in a predetermined rearward and downward path, a window pivotally mounted on said rear side portions of the top, means on said body for swinging said window from a position closing the rear central opening in said top to a position underlying the rear of said top forwardly of said opening, and means for raising the forward end of said deck lid in timed relation with respect to the rearward and downward movement of said top to store said top beneath said deck lid, said means being subsequently operable to raise said deck lid and restore said top to its position over said passenger compartment.

3. In an automotive vehicle having a body provided with a passenger compartment, a retractible rigid top for said passenger compartment, said top having an upper portion and rear side portions at opposite sides thereof defining a rear central opening, a deck lid pivotally mounted at its rearward end upon said vehicle body, means to support and guide said top during its travel in a predetermined rearward and downward path, deck lid operating means for raising the forward end of said deck lid in timed relation with respect to the rearward and downward travel of said top into position beneath the deck lid, top operating means for causing said travel of the top, motor driven means for actuating both of said operating means, a window pivotally mounted in said rear central opening, and means on said body for engaging and swinging said window from a position closing the rear central opening in said top to a position underlying the rear of said top.

4. Mechanism according to claim 3 wherein said top operating means includes a pair of link members pivotally connected together at adjacent ends and having the opposite ends thereof pivotally connected one to the body and the second to the top, said operating means also including a swingable link member connected to said motor driven means for actuation thereby and pivotally connected to said second link member.

5. In an automative vehicle having a body provided with a passenger compartment, a retractible rigid roof for said passenger compartment having a rear central opening, a window mounted in position to close said opening when the roof is disposed in normal position above said passenger compartment, a deck lid pivotally mounted at its rearward end upon the vehicle body, means for supporting and guiding said roof during its retractive travel in a predetermined rearward and downward path, means for raising the forward end of said deck lid in timed relation with respect to the rearward and downward travel of said roof into position beneath the deck lid, operating means for causing said travel of the roof and including a pair of link members pivotally connected together at adjacent ends and having the opposite remote ends thereof pivotally connected one to the body and the second to the roof, said operating means also including a third swingable link member pivotally connected to said second link member, and motor driven means connected to said third link member for swinging the same.

6. In an automotive vehicle having a body provided with a passenger compartment, a retractible rigid roof for said passenger compartment having a rear central opening, a window mounted in position to close said opening when the roof is disposed in normal position above said passenger compartment, a deck lid pivotally mounted at its rearward end upon the vehicle body, means for supporting and guiding said roof during its retractive travel in a predetermined rearward and downward path, deck lid operating means for raising the forward end of said deck lid in timed relation with respect to the rearward and downward travel of said roof into position beneath the deck lid, a second operating means for causing said travel of the roof and including a pair of link members pivotally connected together at adjacent ends and having the opposite remote ends thereof pivotally connected one to the body and the second to the roof, said second operating means also including a third swingable link member pivotally connected to said second link member, and motor driven means connected to said third link member for swinging the same and also connected to said deck lid operating means for actuating the same.

7. Mechanism according to claim 5 wherein said window is pivotally mounted and means is provided for swinging said window from a position closing said opening in the roof to a position underlying the rear of said roof when disposed beneath the deck lid.

References Cited in the file of this patent
UNITED STATES PATENTS

| | | |
|---|---|---|
| 1,774,199 | Good | Aug. 26, 1930 |
| 2,105,293 | Paulin | Jan. 11, 1938 |
| 2,215,363 | Rupple | Sept. 17, 1940 |
| 2,234,040 | Carr | Mar. 4, 1941 |
| 2,471,378 | Shilala | May 24, 1949 |
| 2,704,225 | Anschuetz | Mar. 15, 1955 |
| 2,733,954 | Blake | Feb. 7, 1956 |
| 2,768,025 | Spear et al. | Oct. 23, 1956 |